(12) United States Patent
Kwag et al.

(10) Patent No.: US 8,685,552 B2
(45) Date of Patent: Apr. 1, 2014

(54) SECONDARY BATTERY INCLUDING PROTECTION CIRCUIT MODULE

(75) Inventors: Nohyun Kwag, Suwon-si (KR);
Youngcheol Jang, Suwon-si (KR);
Kyungwon Seo, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 834 days.

(21) Appl. No.: 12/637,974

(22) Filed: Dec. 15, 2009

(65) Prior Publication Data

US 2010/0159287 A1 Jun. 24, 2010

(30) Foreign Application Priority Data

Dec. 18, 2008 (KR) .......................... 10-2008-0129568

(51) Int. Cl.
*H01M 14/00* (2006.01)

(52) U.S. Cl.
USPC ............... 429/7; 429/163; 429/175; 429/176; 429/177

(58) Field of Classification Search
None
See application file for complete search history.

(56) References Cited

U.S. PATENT DOCUMENTS 6,513,700 B2 * 2/2003 Matsuda et al. .............. 228/170
7,510,791 B2 3/2009 Moon et al.

FOREIGN PATENT DOCUMENTS

| JP | 2004-303618 | 10/2004 |
| JP | 2006-004882 | 1/2006 |
| KR | 20-0350720 | 5/2004 |
| KR | 1020050121895 | 12/2005 |
| KR | 1020060012810 | 2/2006 |

OTHER PUBLICATIONS

Notice of Allowance dated Feb. 17, 2011 for corresponding KR Patent Application No. 10-2008-0129568.

* cited by examiner

*Primary Examiner* — Robert Xu
(74) *Attorney, Agent, or Firm* — Knobbe, Martens, Olson & Bear, LLP (57) ABSTRACT

Disclosed is a secondary battery that enhances the coupling strength between a protection circuit module and a bare cell. The secondary battery includes: a bare cell; and a protection circuit module including a circuit board and at least one coupling member coupling the circuit board to the bare cell by welding, the coupling member including a first coupling portion having a substantially plate-like shape coupled to the bare cell by welding and at least a through-hole formed inside the edge of the first coupling portion.

12 Claims, 6 Drawing Sheets

SECONDARY BATTERY INCLUDING PROTECTION CIRCUIT MODULE

CLAIM FOR PRIORITY

This application is based on and claims priority to Korean Patent Application No. 10-2008-0129568 filed on Dec. 18, 2008 in the Korean Intellectual Property Office (KIPO), the entire contents of which are hereby incorporated by reference.

BACKGROUND OF THE INVENTION

1. Field of the Invention

The present invention relates to a secondary battery, and more particularly, to a protection circuit module and a secondary battery including the same.

2. Description of the Related Art

In recent years, due to rapid development of electronics, communications, and computer industries, portable electronic devices are being widely used. Meanwhile, rechargeable secondary batteries are being mainly used as power sources of portable electronic devices.

Currently, pack type batteries are being widely used as secondary batteries. A pack type battery is a unit in which a bare cell providing electric energy and a protection circuit module (PCM) controlling charge and discharge of the bare cell are integrated. The protection circuit module includes a circuit board to which various circuit devices are mounted. The protection circuit module is coupled to the bare cell by laser welding an electrode tab formed in the circuit board to the bare cell whereby the circuit board and the bare cell are physically and electrically connected to each other. However, the protection circuit module can be separated from the bare cell at the welded portion by an external impact, so it is necessary to improve the welding structure of the protection circuit module.

BRIEF SUMMARY OF THE INVENTION

The present invention has been made in view of the above problems, and the present invention provides a secondary battery that enhances the coupling strength between a protection circuit module and a bare cell.

The present invention also provides a secondary battery that improves the laser welding strength between an electrode tab formed on a protection circuit module and a bare cell.

In accordance with an aspect of the present invention, there is provided a secondary battery comprising: a bare cell; and a protection circuit module including a circuit board and at least one coupling member coupling the circuit board to the bare cell by welding, the coupling member including a first coupling portion having a substantially plate-like shape coupled to the bare cell by welding and at least a through-hole formed inside the edge of the first coupling portion.

The entire through-hole may be formed inside the first coupling portion of the coupling member.

The first coupling portion may include at least one protrusion protruding toward the center of the through-hole. Then, the protrusion of the first coupling portion may have a polygonal shape or an arc shape.

The through-hole may have a substantially + shape.

The through-hole may be concaved inward from the periphery of the first coupling portion of the coupling member.

A boss inserted through the through-hole may be formed in the bare cell.

Welding may be carried out around the through-hole so that the first coupling portion of the first coupling member and a portion of the bare cell that is exposed through the through-hole are welded.

The welding may be laser welding.

The coupling member may be an electrode tab electrically connecting the circuit board to the bare cell.

The coupling member may include a support extending from the circuit board and the first coupling portion may be connected to an end of the support.

The number of the coupling members may be two.

According to above-mentioned structures of the present invention, all of the objects of the present invention can be accomplished. More particularly, the welding strength between the coupling member and the bare cell is enhanced by the laser welding portion formed around the through-hole formed in the coupling member of the protection circuit module.

In addition, according to the present invention, since a boss of the bare cell is inserted into a passage formed in the coupling member of the protection circuit module, the coupling strength between the boss and the coupling member is enhanced further by laser welding.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Hereinafter, exemplary embodiments of the present invention will be described in detail with reference to the accompanying drawings.

Figure 1:
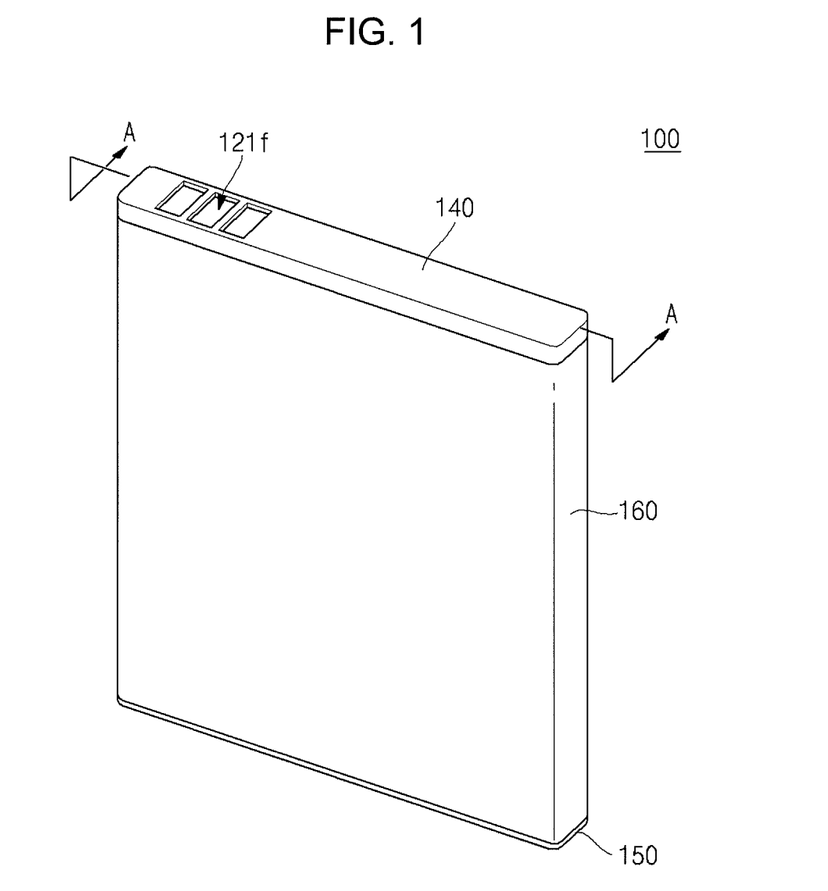
FIG. 1 is a perspective view of a secondary battery according to an embodiment of the present invention.
Figure 2:
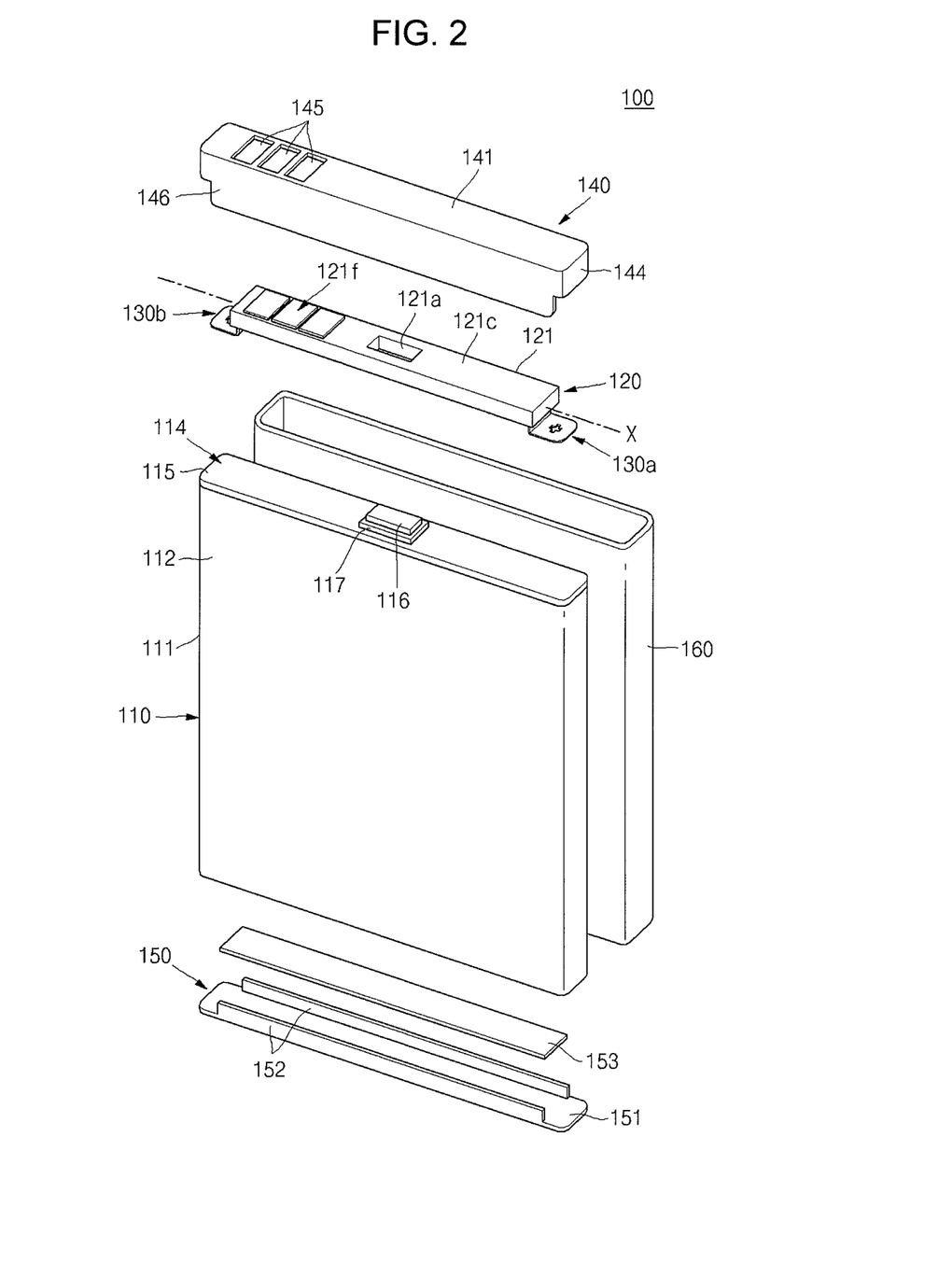
FIG. 2 is an exploded perspective view of the secondary battery of FIG. 1.
Figure 3:
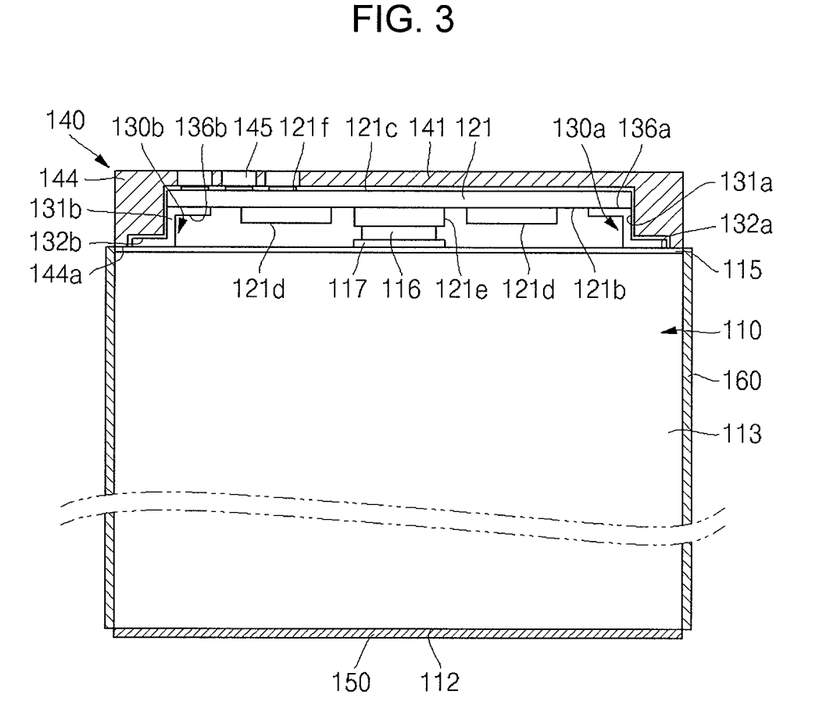
FIG. 3 is a sectional view of a top case, a bottom case, and a label of the secondary battery of FIG. 1 taken along line A-A.
Figure 4:
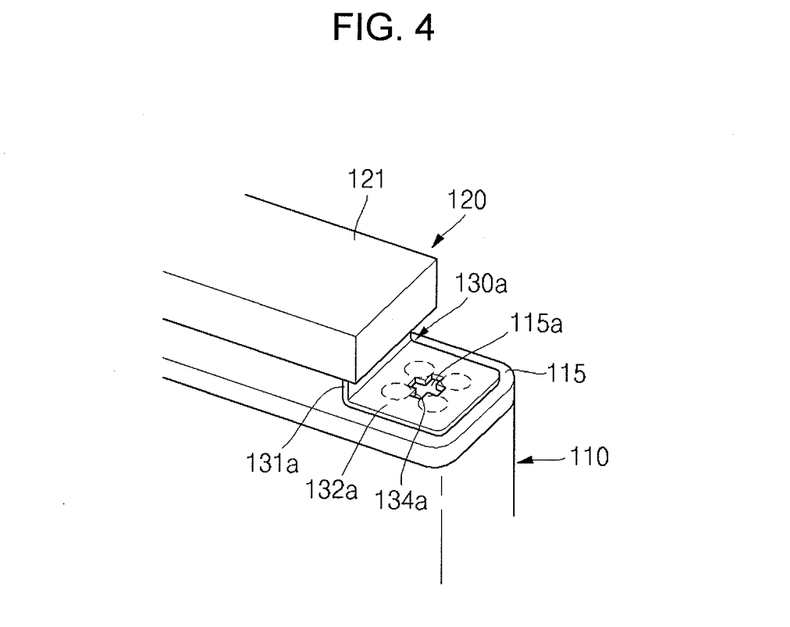
FIG. 4 is an enlarged perspective view of a coupling portion between a first coupling member and a bare cell.
Figure 5:
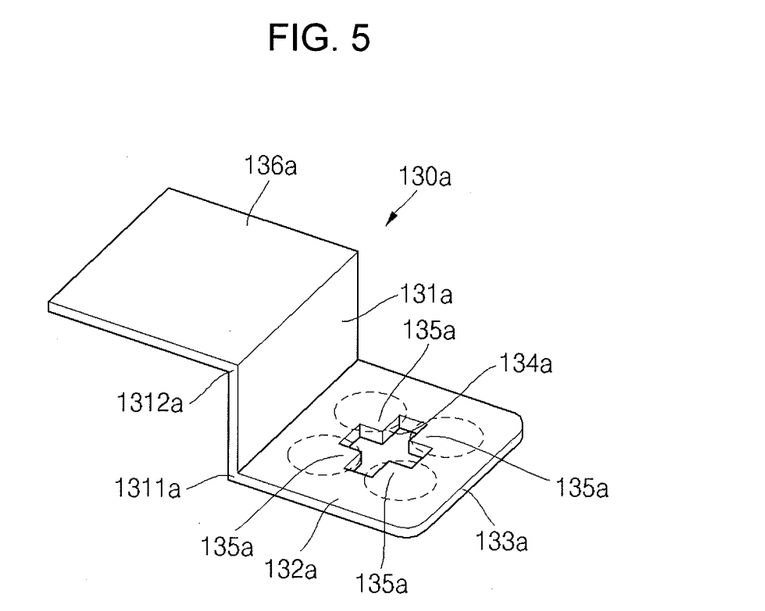
FIG. 5 is a perspective view of a first coupling member of FIG. 4.

FIG. 1 is a perspective view of a secondary battery according to an embodiment of the present invention. FIG. 2 is an exploded perspective view of the secondary battery of FIG. 1. FIG. 3 is a sectional view of a top case, a bottom case, and a label of the secondary battery of FIG. 1 taken along line A-A. FIG. 4 is an enlarged perspective view of a coupling portion between a first coupling member and a bare cell. FIG. 5 is a perspective view of a first coupling member of FIG. 4.

Referring to FIGS. 1 to 3, the secondary battery 100 includes a bare cell 100, a protection circuit module 120, a top case 140, a bottom case 150, and a label 160.

The bare cell 110 is an electrical energy source and includes an electrode assembly (not shown), a can 111 accommodating the electrode assembly through an opening (not shown), and a cap assembly 114 covering the opening (not shown) of the can 111.

Although not illustrated, the electrode assembly includes a positive electrode plate, a negative electrode plate, and a separator interposed between them, which are wound together. A positive electrode tab and a negative electrode tab are coupled to a positive electrode plate and a negative electrode plate, respectively.

The can 111 is a substantially rectangular parallelepiped metal vessel having an opening at its top end. The can 111 provides a space accommodating the electrode assembly and an electrolyte, and is electrically connected to the positive electrode tab to function as a positive electrode terminal thereby. The can 111 is preferably manufactured by deep-drawing aluminum or an aluminum alloy. The can 111 includes a bottom plate having a rectangular shape and a side wall 113 extending upward from the edge of a bottom plate 112.

The cap assembly 114 includes a cap plate 115 and an electrode terminal 116. The cap plate 115 has a substantially rectangular shape and closes the opening formed at the top of the can 111. The cap plate 115 is made of an electrically conductive metal material such as aluminum or an aluminum alloy. The positive electrode tab is electrically connected to the cap plate 115 so that the cap plate 115 functions as a positive electrode terminal. The electrode terminal 116 is located substantially at the center of the cap plate 115 and passes through the cap plate 115. The electrode terminal 116 is electrically insulated from the cap plate 115 by an insulating gasket 117. A negative electrode tab of the electrode assembly is electrically connected to the electrode terminal 116 so that the electrode terminal 116 functions as the negative electrode terminal. In the embodiment of present invention, although the cap plate 115 functions as a positive electrode terminal and the electrode terminal 116 functions as a negative electrode terminal, the present invention is not limited thereto. It is apparent to those skilled in the art that the cap plate 115 may function as a negative electrode terminal and the electrode terminal 116 may function as a positive electrode terminal.

The protection circuit module 120 includes a circuit board 121, a first coupling member 130a, and a second coupling member 130b. The protective circuit module is coupled to the bare cell 110 to control operations of the secondary battery 100 such as charge and discharge operations.

The circuit board 121 is a printed circuit board in which a wiring pattern is printed and has a rectangular bar-like shape extending long along an extension axis line X. A through-hole 121a through which a welding rod can pass is provided at the center of the circuit board 121. The circuit board 121 includes a first surface 121b and a second surface 121c that is the opposite side to the first surface 121b. The first coupling member 130a and the second coupling member 130b are coupled to opposite ends of the first surface 121b. The first surface 121b is spaced apart from the cap assembly 115 of the bare cell 110 and faces the cap assembly 115 of the bare cell 110. An electric circuit device 121d is mounted onto the first surface 121b of the circuit board 121. The electric circuit device 121 includes a control IC and a charge/discharge switching device. A first electrode lead plate 121e is coupled to the first surface 121b of the circuit board 121. The first electrode lead plate 121e electrically attached to the circuit board 121 is made of an electrically conductive material such as nickel. Then, a welding rod (not shown) is introduced into the space between the circuit board 121 and the cap plate 115 of the bare cell 110 through the through-hole 121a formed in the circuit board 121 to electrically couple the electrode terminal 116 to the first electrode terminal 121e.

An external terminal 121f electrically connected to an external load or a charger is formed on the second surface 121c of the circuit board 121.

The first coupling member 130a and the second coupling member 130b are located on opposite lengthwise sides of the circuit board 121. The first coupling member 130a and the second coupling member 130b connect the circuit board 121 of the printed circuit board 120 to the bare cell 110 and at the same time, functions as an electrode tab electrically connecting the circuit board 121 of the printed circuit board 120 to the bare cell 110. The detailed structure of the first coupling member 130a is illustrated in FIGS. 4 and 5. Hereinafter, the structure of the first coupling member 130a will be described in detail with reference to FIGS. 2 to 5.

Referring to FIGS. 2 to 5, the first coupling member 130a is formed by bending a plate made of an electrically conductive metal such as nickel. The first coupling member 130a includes a support 131a, the first coupling portion 132a, and the second coupling portion 136a.

The support 131a having a substantially flat plate-like shape extends toward the cap plate 115 in a direction perpendicular to the circuit board 121 between the first surface 121b of the circuit board 121 and the cap plate 115 to maintain a suitable distance between the circuit board 121 and the bare cell 110.

The first coupling portion 132a having a substantially flat plate-like shape extends from an end 1311a of the support 131a that is close to the cap plate 115 toward the outside of the circuit board 121. The first coupling portion 132a is coupled to the cap plate 115 of the bare cell 110.

The first coupling portion 132a has a through-hole 134a formed inside the edge 133a of the first coupling portion 132a. The entire through-hole 134a is formed inside the first coupling portion 132a. The through-hole 134a exposes a portion of the bare cell 110 to enhance welding strength. The through-hole 134a generally has a cross or '+' shape, and the first coupling portion 132a has four protrusions 135a protruding from circles to the center of the through-hole 134a respectively. As illustrated in FIG. 4, welding is carried out to the regions (designated as dotted lines) of the four protrusions 135a with the first coupling portion 132a of the first coupling member 130a being contacted with the cap plate 115 of the bare cell 110, to couple the first coupling member 130a to the bare cell 110 thereby. Then, the contact region between the first coupling portion 132a and the cap plate 115 is coupled by welding and, at the same time, the first coupling portion 132a and the exposed portion 115a of the cap plate 115 of the bare cell 110 exposed through the through-hole 134a are fused to each other, thereby enhancing the coupling strength between the first coupling portion 132a and the cap plate 115 further. In the embodiment of the present invention, the first coupling member 132 and the cap plate 115 are coupled to each other by laser welding.

The second coupling portion 136a having a substantially flat plate-like shape extends in the opposite direction to the first coupling portion 132a from an end 1312a of the support 131a that is close to the circuit board 121. The first coupling portion 132a is coupled to the cap plate 115 of the bare cell 110.

A second coupling member 130b includes a support 131b, a first coupling portion 132b, and a second coupling portion 136b. Since the structure and operation of the second coupling member 130b are the same as those of the first coupling member 130a, a detailed description thereof will be omitted.

In the embodiment of the present invention, although both the first coupling member 130a and the second coupling member 130b support the circuit board 121 and function as electrode tabs, the present invention is not limited thereto. In other words, one of the two coupling members 130a and 130b may not function as an electrode tab but may only support the circuit board. In a different way, both of the coupling members 130a and 130b may have function of supporting the circuit board but not a function of electrode tabs. It is apparent that those skilled in the art can easily understand other structures functioning as an electrode tab.

The following Table 1 shows test results of coupling strengths between the protection circuit module 120 and the bare cell 110 that are coupled by the first coupling member 130a and the second coupling member 130b as tensile forces (kgf). Laser welding is used for the coupling and the laser welding conditions are as follows: an energy output peak of 3.0 kw, a welding time of 3.0 ms, and a pressure strength to the welding region of 8 kgf. The test results of comparative examples in which the first coupling portion 132a and the second coupling portion 132b are laser-welded to each other without through-holes 134a respectively were obtained using the same conditions.

TABLE 1

| No | Embodiment | Comparative example |
| --- | --- | --- |
| 1 | 4.7 | 3.2 |
| 2 | 5.0 | 5.9 |
| 3 | 3.4 | 5.1 |
| 4 | 3.6 | 4.5 |
| 5 | 3.5 | 3.5 |
| 6 | 4.2 | 3.0 |
| 7 | 4.1 | 4.1 |
| 8 | 3.1 | 3.2 |
| 9 | 5.9 | 3.4 |
| 10 | 4.1 | 3.5 |
| Average | 4.16 | 3.94 |

As shown in FIG. 1, the average coupling strength of the embodiment of the present invention is 4.16 kgf and the average coupling strength of the comparative examples is 3.94 kgf. The coupling strength of the embodiment of the present invention is increased by about 6% as compared with the coupling strength of the comparative example.

Hereinafter, a through-hole according to another embodiment of the present invention will be described in detail.

Figure 6A:
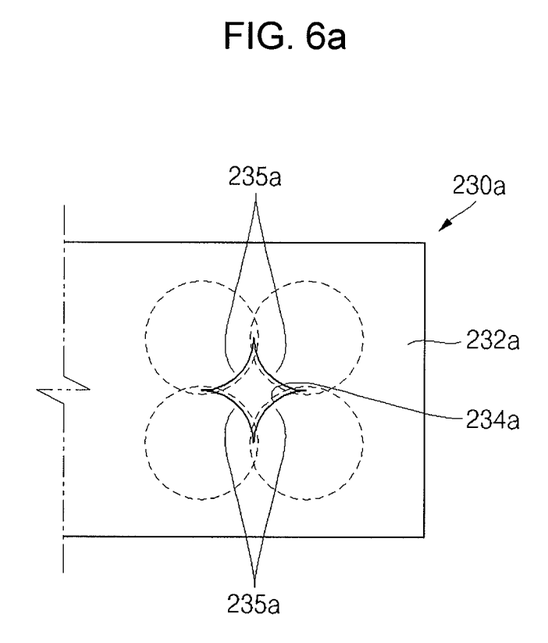
FIG. 6a is a plan view of a first coupling member of FIG. 4 according to another embodiment of the present invention.

A through-hole according to the embodiment of the present invention is illustrated in FIG. 6A. Referring to FIG. 6A, a through-hole 234a is formed by connecting four protrusions 235a having an arc shape in the first coupling portion 232a of the first coupling member 230a. When the protrusions 235 have arc shapes, the welding regions of the protrusions 235a are formed along the arc peripheries of the protrusions 235a and the periphery of the through-hole 234a can be more uniformly fused.

Hereinafter, a through-hole according to still another embodiment of the present invention will be described in detail.

Figure 6B:
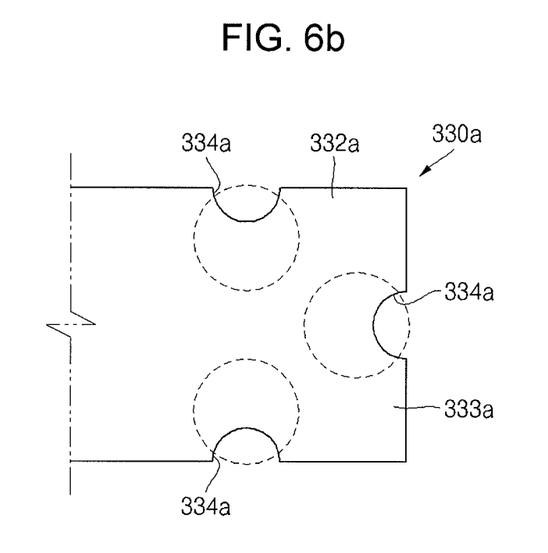
FIG. 6b is a plan view of a first coupling member of FIG. 4 according to still another embodiment of the present invention.

A through-hole according to the embodiment of the present invention is illustrated in FIG. 6b. Referring to FIG. 6b, the through-hole 334a formed in a first coupling portion 332a of a first coupling member 330a is concaved inward from the edge 333a of the first coupling portion 332a. Welding portions are formed at adjacent regions of the through-holes 334a. In this way, when the through-holes 334a are formed on the edge 333a of the first coupling member 330a, a plurality of through-holes 334a may be formed at various positions.

The through-holes for welding the first coupling portion 332a are not limited to the above embodiments of the present invention. The through-hole may have a circle, a triangle, a square, and the other shapes, and the welding region may be formed around the through-hole.

A top case 140 accommodates the protective circuit module 120 and protects the protective circuit module 120. The top case 140 includes a cover plate 141 and a side wall 144 extending downward from the top plate 141.

The cover plate 141 has a shape substantially corresponding to that of the cap plate 115 of the bare cell 110. A through-hole 145 is formed in the cover plate 141. The through-hole 145 exposes an external terminal 121f of the protective circuit module 120 to the outside. The inner surface of the cover plate 141 faces the second surface 121c of the circuit board 121 of the protective circuit module 120.

The end 144a of the side wall 144 makes contact with the cap plate 115 of the bare cell 110 and supports the top case 140. The outer peripheral portion of an end 144a of the side wall 144 extends further to form an extension 146. The extension 146 covers an upper portion of the side wall 113 of the can 111 of the bare cell 110.

A bottom case 150 includes a bottom plate 151 and two extensions 152 upwardly extending from the bottom plate 151. The bottom plate 151 has substantially the same shape as that of the bottom plate 112 of the bare cell 110 and is attached to the bottom plate 112 of the bare cell 110 by an adhesive member 153. The extensions 152 cover the lower portions of the side walls 113 of the can 111 of the bare cell 110.

A label 160 is attached to wrap the side walls 113 of the bare cell 110. The label 160 covers the extension 146 formed on the top case 140 and the extension 152 of the bottom case 150.

Hereinafter, the coupling structure of a coupling member and a bare cell of a secondary battery according to another embodiment of the present invention will be described in detail.

Figure 7:
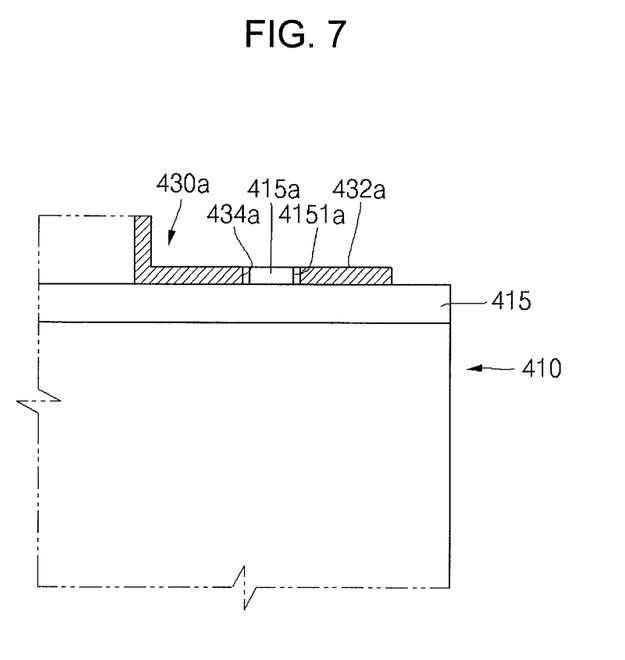
FIG. 7 is a sectional view of a coupling structure between a coupling member of a secondary battery and a bare cell according to another embodiment of the present invention.

FIG. 7 illustrates the coupling structure of the coupling member and the bare cell of the secondary battery according to another embodiment of the present invention. Referring to FIG. 7, a through-hole 434a is formed in a first coupling portion 432a of a first coupling member 430a. The through-hole 434a formed in the first coupling portion 432a of the first coupling member 430a may have various shapes including through-holes 134a, 234a, and 334 described in FIG. 5, FIG. 6a, and FIG. 6b. A cap plate 415 of the bare cell 410 has a boss 415a. The boss 415a is inserted into the through-hole 434a of the first coupling member 432a of the first coupling member 430a. The outer periphery of the boss 415a is preferably close to the edge of the through-hole 434a of the first coupling member 432a. When laser welding is carried out around the through-hole 434a of the first coupling member 432a, the boss 415a provides a larger area where it is fused to the edge of the through-hole 434a of the first coupling portion 432a. Thus the coupling strength between the first coupling member 430a and the bare cell 410 increases further.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A secondary battery comprising:
a bare cell; and a protection circuit module including a circuit board and at least one coupling member coupling the circuit board to the bare cell by welding, the coupling member including a first coupling portion having a substantially plate-like shape coupled to the bare cell by welding and at least a through-hole formed inside the edge of the first coupling portion wherein the first coupling portion includes at least one protrusion adjacent the through-hole so as to be surrounded by the through-hole on at least two sides wherein welds are formed so as to be both positioned on the portion of the bare cell exposed by the through-hole and so as to be interposed between the at least one protrusion of the first coupling portion and the bare cell.

2. The secondary battery of the claim 1, wherein the entire through-hole is formed inside the first coupling portion of the coupling member.

3. The secondary battery of the claim 1, wherein the protrusion of the first coupling portion has a polygonal shape.

4. The secondary battery of the claim 1, wherein the protrusion of the first coupling portion has an arc shape.

5. The secondary battery of the claim 1, wherein the through-hole has a substantially + shape.

6. The secondary battery of the claim 1, wherein the through-hole is concaved inward from the periphery of the first coupling portion of the coupling member.

7. The secondary battery of the claim 1, wherein a boss inserted through the through-hole is formed in the bare cell.

8. The secondary battery of the claim 1, wherein welding is carried out around the through-hole so that the first coupling portion of the first coupling member and a portion of the bare cell that is exposed through the through-hole are welded.

9. The secondary battery of the claim 1, wherein the welding is laser welding.

10. The secondary battery of the claim 1, wherein the coupling member is an electrode tab electrically connecting the circuit board to the bare cell.

11. The secondary battery of the claim 1, wherein the coupling member includes a support extending from the circuit board and the first coupling portion is connected to an end of the support.

12. The secondary battery of the claim 1, wherein the number of the coupling members is two.

* * * * *